United States Patent [19]

Wang et al.

[11] Patent Number: 4,847,786

[45] Date of Patent: Jul. 11, 1989

[54] OBJECT ANALYSIS OF MULTI-VALUED IMAGES

[75] Inventors: Jing Wang, Goleta; Gerardo Beni, Santa Barbara, both of Calif.

[73] Assignee: The Regents of the University of California, Berkeley, Calif.

[21] Appl. No.: 898,076

[22] Filed: Aug. 20, 1986

[51] Int. Cl.$^4$ .............................................. G06K 9/39
[52] U.S. Cl. ................................. 364/518; 358/163; 382/18; 382/51
[58] Field of Search .............................. 364/518-522; 382/51, 48, 18; 358/163, 166, 280-284

[56] References Cited

U.S. PATENT DOCUMENTS

| | | | |
|---|---|---|---|
| 4,601,057 | 7/1986 | Tsuji et al. | 382/51 |
| 4,656,665 | 4/1987 | Pennebaker | 382/51 |
| 4,695,884 | 9/1987 | Anastassiou et al. | 382/51 X |
| 4,710,822 | 12/1987 | Matsunawa | 382/51 X |

OTHER PUBLICATIONS

R. Cunningham, "Segmenting Binary Images", Robotics Age, Jul./Aug. 1981, pp. 4–19.
A. Rosenfeld and John Pfaltz, "Sequential Operations in Digital Picture Processing", JACM, vol. 13, No. 4, Oct. 1966, pp. 471–494.
R. Lumia, L. Shapiro, and O. Zuniga, "A New Connected Components Algorithm for Virtual Memory Computers", Computer Vision, Graphics and Image Processing 22, 1983, pp. 287–300.
H. Samet, "Connected Component Labeling Using Quadtrees", JACM, vol. 28, No. 3, Jul. 1981, pp. 487–501.
Dana H. Ballard et al., Computer Vision; 2.2.6 Digital Images and 2.3 Imaging Devices for Computer Vision, in Chapter 2, pp. 35–44.
Xavier Castillo A Study of Multidimensional Multicolor Images, pp. 111–121.
Pratt Digital Image Processing; Wiley Interscience ISBN 0—471—01888—0, pp. 514–530.

Primary Examiner—Gary V. Harkcom
Assistant Examiner—H. R. Herndon
Attorney, Agent, or Firm—Peter J. Dehlinger

[57] ABSTRACT

Method and apparatus for analyzing a 2-dimensional sensory-input field containing three or more distinct classes of objects. The field is represented by a 2-dimensional array of elements in which each separate class of objects in the field has a separate classification value. The field is scanned with a 2×2 window containing the element being scanned and three adjacent and connected window elements, where each of the adjacent window elements has been previously assigned an object label which identifies one object containing that element. If the element being scanned has the same classification value as any of the adjacent window element, it is assigned the object label of that same-classification window element. Otherwise, the element being scanned is assigned a new label. If the element being scanned has the same classification value as two adjacent and orthogonal elements, and these orthogonal elements have been previously given different object labels, the two different object labels are merged. The result is to identify each separate object in the image. Geometric properties of the objects can be calculated during the scanning procedure.

9 Claims, 3 Drawing Sheets

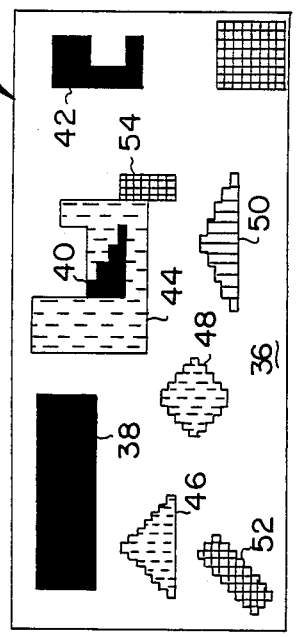
FIG. 2A
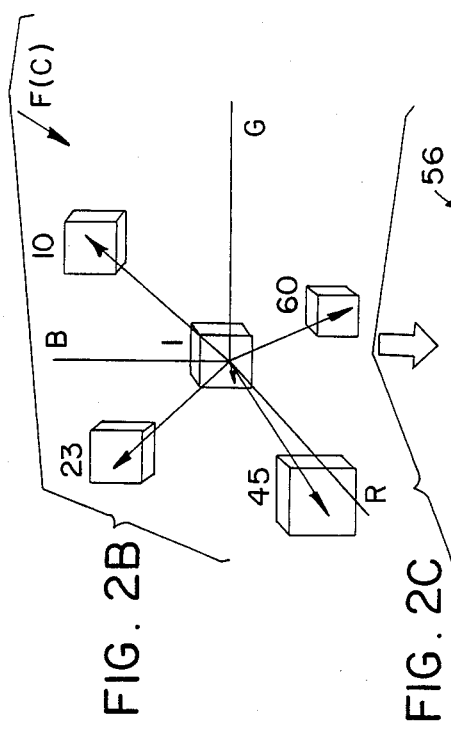
FIG. 2B
FIG. 2C
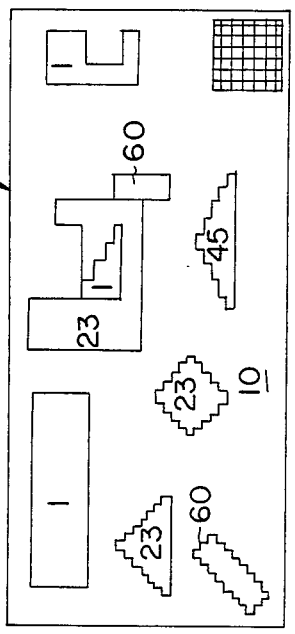
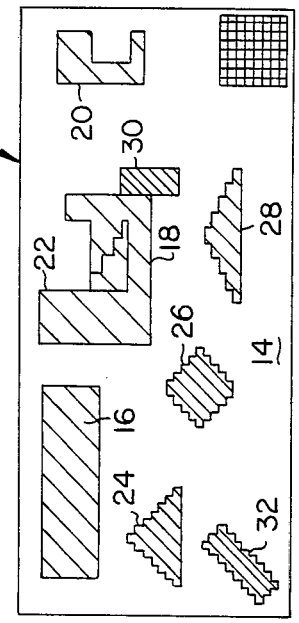
FIG. 1A
FIG. 1B
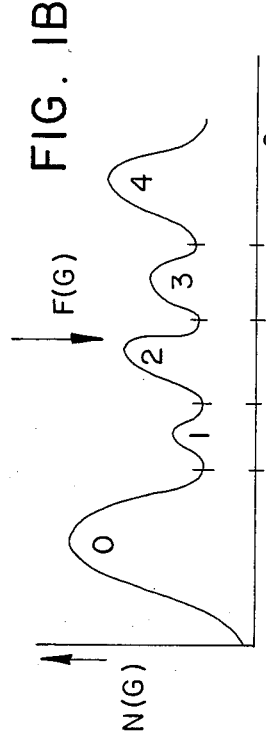
FIG. 1C
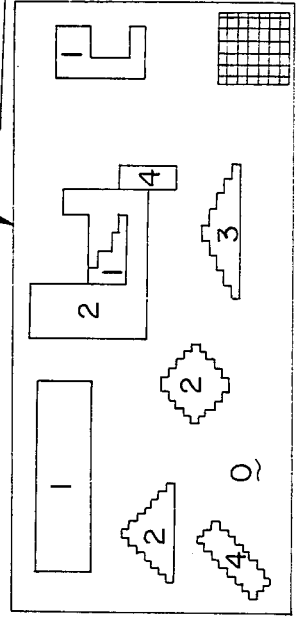

OBJECT ANALYSIS OF MULTI-VALUED IMAGES

This invention was made with Government support under Grant No. CDR-84-21415 awarded by the National Science Foundation. The Government has certain rights in this invention.

FIELD OF THE INVENTION

The present invention relates to image analysis, and in particular, to a method and apparatus for analyzing the number and geometric properties of objects in a field whose elements can be assigned more than two distinct values.

REFERENCES

D. H. Ballard and C. M. Brown, "Computer Vision," Prentice-Hall, 1982.

X. Castillo, D. Yorkgitis, and K. Preston, "A Study of Multidimensional Multicolor Images," IEEE Tran. on Biomedical Engineering, Vol. BME-29, No. 2, Feb. 1982, pp. 111–121.

R. Cunningham, "Segmenting Binary Images," Robotics Age, July/August 1981, pp. 4–19.

R. O. Duta et al., "Graphical Data Processing Research Study and Experimental Investigation," AD650926, March 1967, pp. 28–30.

Agin, G. J., "Image Processing Algorithm for Industrial Vision", draft of SRI, March, 1976.

R. Lumia, L. Shapiro, and O. Zuniga, "A New Connected Components Algorithm for Virtual Memory Computers", Computer Vision, Graphics and Image Processing 22, 1983, pp. 287–300.

W. K. Pratt, "Digital Image Processing," John Wiley & Sons, 1978.

A. Rosenfeld and J. L. Pealts, "Sequential Operations in Digital Picture Processing," JACM, Vol. 13, No. 4, Oct. 1966, pp. 471–494.

H. Samet, "Connected Component Labeling Using Quadtrees," JACM, Vol. 28, No. 3, July 1981, pp. 487–501.

M. R. Ward, L. Rossol, and S. W. Holland, "CONSIGHT: A Practical Vision-Based Robot Guidance System," Proceedings of the 9th International Symposium on Industrial Robots, March 1979, pp. 195–212.

BACKGROUND OF THE INVENTION

Automated image analysis aimed at identifying types, number and properties of objects in a multi-object field has several important applications. For example, as a quality control device in industry, automated image analysis would allow for rapid inspection of electronic or other complex components for quality control purposes, to check, for example, that a complex microchip contains the requisite numbers of each type of circuit elements. Another application is in satellite picture analysis. Here it is desirable to identify a number of different objects, such as water, clouds, land, buildings, roads, and the like, and to characterize the identified objects either as to number and/or physical characteristics, such as position, size, shape, and orientation. Robotics vision, for use in acting on one or more objects in a multi-image field, is another application.

Connectivity analysis is widely used for lower-level image analysis where objects are to be classified as to type, number, and/or geometric properties. In this method, each pixel element is labelled with a specified object value which is related either to the brightness of the object in a black/white image, or to the color in a multi-color image, or to some other physical characteristic which can be distinguished and classified on the basis of information available from the image. Each pixel is then scanned, in a row-by-row manner, with a scanning window that includes the pixel being scanned and adjacent row and column pixels. In two-dimensional analysis, the adjacent pixels in the window may include either two orthogonally adjacent pixels (4-connectivity) or two orthogonally and one diagonally adjacent pixels (6-connectivity or 8-connectivity). The reader is referred to above-cited articles by Rosenfeld, Lumia, Samet, Duta, Ward, Cunningham, Pratt and Ballard for a discussion of various aspects of connectivity analysis.

Connectivty analysis has been applied primarily to binary images heretofore. In the usual application, a black and white image is broken down by a brightness histogram into two or more distinct regions of brightness which are separated by local minima. One of these minima is selected as a brightness threshhold, with all pixels on the lower side of the threshhold being assigned a background "zero" value, and all pixels above the threshhold being assigned an object "one" value. The image is then analysed for "one" value connectivity, to determine the number and geometric properties of such one-value objects.

The connectivity analysis of binary images generally involves examining the pattern of zero and one value connectivity in a $2 \times 2$ scanning window, and on the basis of the pattern, assigning the scanned pixel to either (a) background (b) an already established object (c) a new object or (d) a merger of two previously distinct objects. In the case of 6-connectivity, the number of distinct cases which may be considered in the analysis is $2_4$, which can be reduced to eight symmetrically equal (zero and one values interchanged) cases. The connectivity algorithm, which must consider only eight cases at each scanning position, can be executed rapidly by computer.

In the case of multivalued images, such as images in which different classes of objects are represented by different shades of grey, or by different colors, the number of cases which must be considered, for absolute configuration matching, increases rapidly, with increasing number of pixel values. Thus, in a $2 \times 2$ window, the number of cases which must be considered for a m-valued image is $m^4$, which even for a three-valued image means considering about 81 cases (less symmetrical cases). It can be appreciated that large-valued images could not be practically handled in this way.

One solution to multi-valued connectivity analysis which has been employed heretofore involves analysis of a series of binary images which are generated at different threshhold values of a black and white image, or by different filter values for a multi-color image. For example, in the case of a black and white image whose brightness histogram contains three or more brightness regions separated by local minima, each minimum can be selected as threshold to generate a separate binary image, with the two or more images being combined after separate connectivity analysis. This approach requires additional processing time and/or additional parallel computational capacity with each added class of objects, and thus becomes impractical for many-valued images. However, it is these many-valued images which are expected to be of greatest interest for future applications, as suggested above.

SUMMARY OF THE INVENTION

It is therefore a general object of the invention to provide a method and apparatus for performing rapid connectivity analysis of many-valued images.

It is a more specific object of the invention to provide such a method whose connectivity algorithm is substantially as fast as a binary image algorithm, independent of the number of distinct values in the image being analysed.

It is another specific object of the invention to provide such an apparatus which can be used for rapid analysis of the number and geometrical properties of objects in complex colored images.

The method of the invention is designed for analyzing a sensory-input field containing three or more, distinct classes of objects, such as a two-dimensional image containing a background (one object) and at least two different classes of objects on the background. In practicing the method, the image field is represented as a 2-dimensional array of elements in which (a) each element represents a portion of a single object, (b) all of the elements representing the same class of objects are assigned a single classification value, and (c) each of the three or more classes of objects in the field is assigned a different classification value. The classification is carried out by a suitable thresholding or mapping device in the apparatus of the invention.

Each individual element in the array is scanned systematically, such as row-by-row, or column-by column, with a 2×2 window containing the element being scanned and 3 adjacent and connected window elements, where each of the adjacent window elements has been previously assigned an object label which uniquely identifies an object containing such adjacent element. If the element being scanned has the same classification value as that of any of the 3 adjacent window elements, it is assigned the same object label as that previously given to the same-value window element. If not, the scanned element is assigned a new object label. The scanning and labelling functions are carried out by suitable program means in the apparatus. The classification and object labels may be separately stored, or, if the image is labelled in place, at least one adjacent row and an adjacent column pixel must be stored in a memory buffer.

The analysis is based on 6-connectivity, by which all orthogonally connected objects having the same classification value, but different object labels, are merged. The scanning, labelling and merging steps identify each separate object in the field by a separate, object label. The method can be used in generating geometrical information about each object in the field, such as area, moment, and perimeter. The information can be calculated on an updated basis during the labelling procedure, based on the object label assignment made with respect to each scanned element.

In a preferred embodiment of the invention, object-value assigning is done by (a) generating a same/not-same pattern of classification values in the 2×2 scanning window, (b) identifying the generated pattern as one of the possible same/not-same patterns, and (c) based on the pattern identification, assigning an object label to the element being scanned.

For use in analysing a black and white digitized image, the different classification values can be assigned by mapping each element in the array into one of several brightness classes on a brightness histogram of the image. For use in analysing a multi-colored field in which different colors represent different groups of objects, and the colors are represented in the form of vectors in a color space, the different classification values can be assigned by mapping each element's color vector into one of a number of finite color regions in the color space.

These and other objects and features of the invention will become more fully apparent when the following detailed description of the invention is read in conjunction with the accompanying drawings.

BRIEF DESCRIPTION OF THE DRAWINGS

FIGS. 1A-1C show an exemplary black-and white digitized image which is to be analyzed according to the method of the invention (1A), a brightness histogram of the digitized image (1B), and the image after mapping the pixel elements making up the image into the classification values in the histogram (1C);

FIGS. 2A-2C show an exemplary multi-colored digitized image which is to be analysed according to the method of the invention (2A), a three-dimensional color space showing the color vectors which identify the different colors of the objects in the image, and the color subspaces which contain these vectors (2B), and the image after mapping the pixel elements making up the image into the classification values of the color subspaces (2C);

DETAILED DESCRIPTION OF THE INVENTION

A. Object Classification

Figure 4:
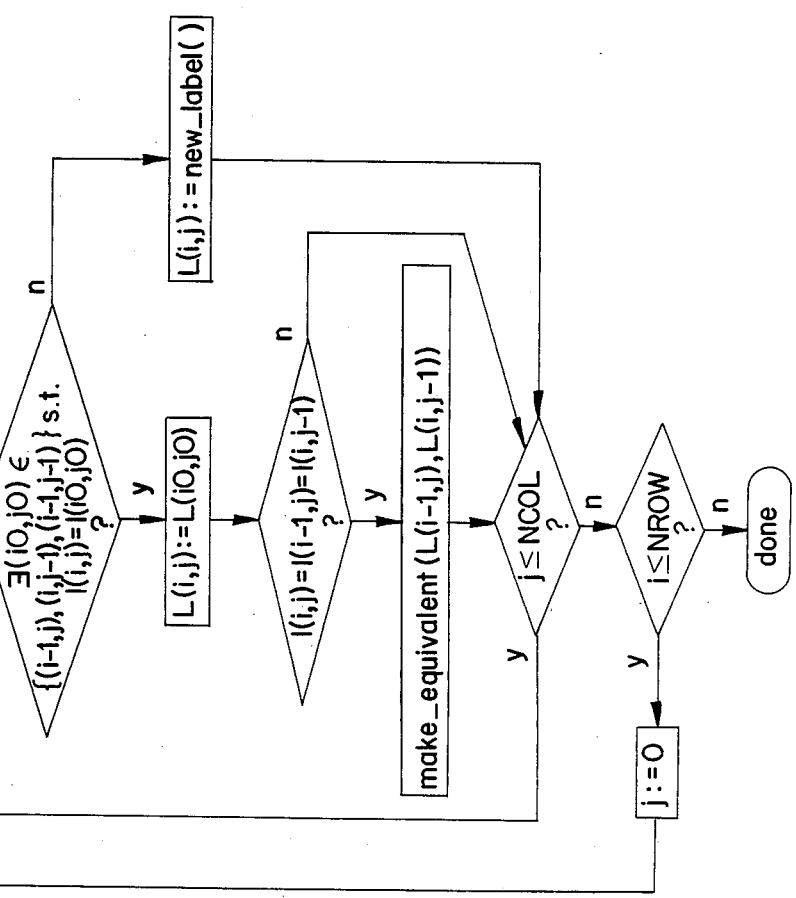
FIG. 4 is a flow chart of the basic connectivity algorithm used in the invention.

The method of the invention is designed for computerized analysis of a scene which contains three or more different classes of objects of interest, for purposes of determining specific information about the objects, for example, the kind, number, size, shape, and/or arrangement of objects. A typical scene is one which can be readily represented in two-dimensions, i.e., where the desired information can be determined without depth of field information. Examples of such scenes include, as indicated above, small assembly line components, such as microelectronic wafers which contain a number of different circuit components, and ground features which are evident from satellite photographs. More generally the method is applicable to both 2- and 3-dimensional scenes, as will be seen.

The scene is viewed, in the useful case, by a photoimaging device capable of converting the scene to a 2-dimensional array of picture elements or pixels, where each pixel has a scalar or vector quantity which associates some physical property of the image, such as object brightness or color, with that element. For example, if the scene is viewed by a conventional TV camera, the picture elements in the 2-dimensional image may have a brightness value of between 0 and 255 in a black-and-white image, or a three-dimensional red/blue/green (RBG) vector quantity, in a colored image.

The pixel quantity in the image array may also represent other physical features of the scene, such as chemical composition, temperature, or radiation level, which can be detected by known sensing devices and converted to digitized images (sensory input fields) by suitable analog-to-digital array converters.

As defined herein, each object in an image is a maximally connected set of pixels that belong to the same pixel class, where a pixel class is a set of pixel values within a specified range, and a class of objects is a set of objects whose pixel values all belong to the same pixel class. In accordance with the invention, the digitized image is represented as an image array in which (a) each element (pixel) represents a portion of a single object in the field, (b) all of the elements representing the same class of objects are assigned a single classification value, and (c) each of the three or more classes of objects in the field is assigned a different classification value. The representation procedure will be discussed with respect to FIGS. 1 and 2, which illustrate generally procedures for representing a black-and-white image, indicated at 10 in FIG. 1A, and a color image, indicated at 12 in FIG. 2A.

Image 10 contains five classes of objects which can be identified by different ranges of grey levels, indicated in the figure by different shading levels. The objects include a background 14 (lighest grey level), three geometric objects 16, 18, 20 with light-to moderate grey level, three geometric objects 22, 24, 26, with moderate grey level, one object 28 with moderate-to-dark grey level, and two objects 30, 32, with dark grey level. The different pixel classes are determined, according to one preferred method, by constructing a histogram of the number of pixels $N(G)$ having a given grey value $G$. Such a histogram of the distribution of grey values in image 10 is shown in FIG. 1B. As seen, the histogram divides the image into five distinct pixel classes which are separated by local minima. These classes are designated by five classification values 0-4, as indicated. The histogram thus provides a function $F(G)$ which maps each pixel brightness value in image 10 into one of the five classification values in the histogram. These classification values now replace the original image brightness values assigned to its pixel, yielding the image shown at 34 in FIG. 1C. As seen, the pixels in each class of objects now all have the same classification value, and each class of objects has a unique classification value. That is, each of the five ranges of pixel values is a pixel class, and each objects in that class is characterized by connected pixel elements whose brightness values all fall within the range defined by that class.

Image 12 in FIG. 2A is like image 10, except that the different classes of objects are distinguishable on the basis of different colors rather than brightness values. As seen in the figure, the objects include a white background 36, three black geometric objects 38, 40, 42, three magenta objects 44, 46, 48, one red object 50, and two yellow objects 52, 54. The different color classes of objects in the image are determined, according to one preferred method, by subdividing a color space (FIG. 2B) into a number of discrete cubical volumes, such as volumes 1, 10, 23, 45, and 60, shown in the figure, each of which covers a range of red, blue, and green scalar components. The color-space volumes are selected in size such that all color vectors for the pixels representing a single color class of objects will be contained in a single volume. FIG. 2B shows a single representative color vector from each class of colored objects in the color space. As indicated, the color vectors for the background class (white) falls within volume 1; for the black objects, in volume 10; for the magenta objects, in volume 23; for the red object, in volume 45; and for the yellow object, in volume 60.

It can be appreciated that the divided color space provides a function $F(C)$ which maps each pixel color vector in image 12 into one of the five color volumes, and therfore into one of the five corresponding classification values used to designate the color volumes. These classification values now replace the original color vector values assigned to each pixel, yielding the image shown at 56 in FIG. 1C. As in image 34 described above, the pixels in each class of objects now all have the same classification value, and each class of objects has a unique classification value.

Classification devices designed for achieving the same-class image representation just described for both black-and-white and color images can be designed from conventional image processing components. In the case of the black-and-white processing, the device preferably includes (a) a camera for photoimaging the scene of interest, to produce a 2-dimensional array of elements in which each element has a certain grey value, (b) computational means for constructing an image-brightness histogram which contains, for each class of objects in the field, a distinct brightness class which is separated from each adjacent brightness class by a local minimum, and a second computational means for assigning to each element in the array, a classification value corresponding to the pixel class whose brightness range includes the grey value of that element.

For use in analysing a multi-colored 2-dimensional field in which different colors represent different classes of objects, the classification device preferably includes (a) a camera for photoimaging the scene of interest, to produce a 2-dimensional array of elements in which the color associated with each element is indicated by a vector in a defined color space, (b) computational means for associating each element vector with one of a finite set M of color regions in the color space, where the total number of color regions is sufficient to allow representation of each different class in the field with a distinct color region, and (c) computational means for assigning to each element in the array, a classification value corresponding to the color class whose color range includes the color vector associated with that pixel.

B. Object Labelling

Figure 3:
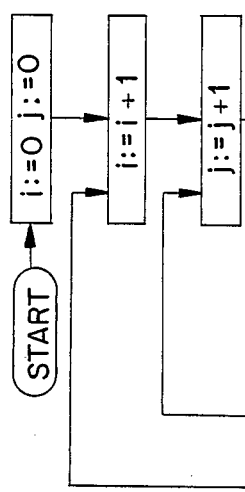
FIG. 3 illustrates a 2×2 scanning window in a 2-dimensional image array containing I columns and J rows.

This section describes the connectivity algorithm which allows for rapid labelling (plus possible feature collection) of multi-valued images. The algorithm is based on 6-connectivity in which each pixel in the image is scanned systematically, e.g., in a side-to-side, top-to-bottom direction, with a $2 \times 2$ scanning window containing the pixel being scanned and three adjacent, connected pixel elements. The scanning window for a 2-dimensional image is seen in FIG. 3. The pixel being scanned is indicated at $I(i,j)$, which designates the classification value I of the pixel in the ith column and jth row. The window includes the three adjacent pixels which are indicated in the figure by their classification values $I(i, j-1)$, $I(i-1, j)$, and $I(i-1, j-1)$. The first two of these are orthogonal and the third is diagonal to the scanned pixel.

The algorithm used for connectivity analysis in two dimensions, according to the present invention, is shown in flow-diagram form in FIG. 4. The algorithm assigns to each successive pixel being scanned an object label which identifies that pixel as belonging to one distinct object contained in the field. The assignment is made, according to an important aspect of the invention, on the basis of a same/not-same algorithm which either assigns the pixel being scanned the same object label as one of the 3 adjacent pixels in the scanning window, if the scanned pixel and the adjacent pixel have the same classification value, or a new object level, if the scanned pixel does not have the same classification as another scanning window pixel. The assignment logic is indicated in the center portion of the flow diagram.

The scanning method requires that each of the three adjacent window pixels have a previously assigned object label. Initially, in the case where the first pixel scanned is at one corner of the image, this is done by providing a single-pixel thickness border about the image, and assigning these border pixels a background classification index (e.g., 0), and a first-object label (e.g., 0). Thus, in the scheme shown, where the first pixel scanned is at the upper left (1,1), this element is compared in classification value with three border elements (1,0), (0,0), and (0,1). Assuming that first element being scanned is a background element, it will be assigned a background label. This label is saved in a storage buffer for use in the next scanning window. The scanning window is now advanced one pixel to the right, and the classification value of pixel (2,1) is compared with that of (2,0), (1,0), and (1,1). The second pixel is assigned either a background label, if it has a background classification value, or a new object label (e.g., 1), if it is not in the background. The image being labelled and the labelled image may be stored in separate memories. Alternatively, the image may be labelled in place. In the later case, it is necessary to store classification values for at least one adjacent row and the adjacent column in a buffer memory. The scanning proceeds, as indicated in FIG. 4, in a right-to-left, top-to-bottom direction, until the lower right corner of the image is reached.

With continued reference to FIG. 4, it is noted that immediately following object labelling, the scanning window is queried to see whether the pixel being scanned has the same classification value as the two orthogonal window pixels. If it does, and the two orthogonal pixels have been previously given different object labels—indicating the two pixels are members of different objects, the two labels are merged to reflect the fact that the two previously labelled orthogoanl pixels are in fact members of the same object. The types of object configuration that require merging will be seen below with respect to FIG. 7.

Figure 5A:
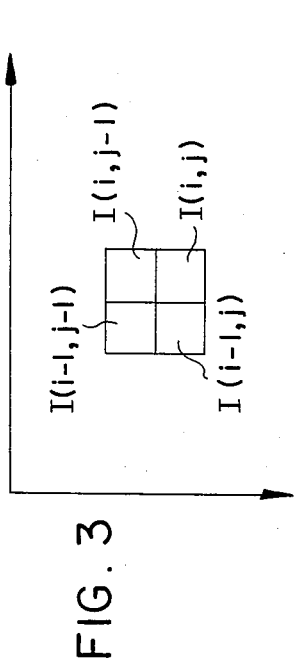
FIG. 5 illustrates how a multi-valued image is object labelled in the method of the invention.
Figure 5B:
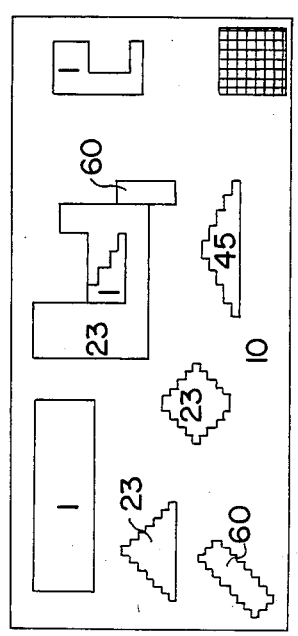
Figure 5B:
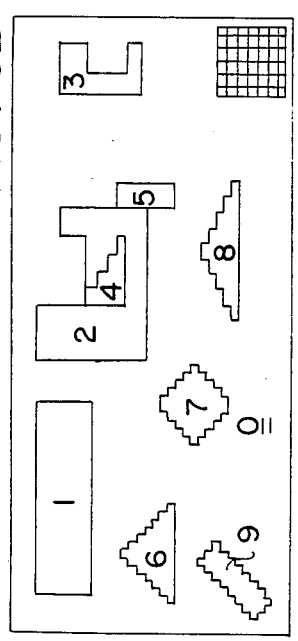

FIG. 5 illustrates the operation of the labelling algorithm on image 56 (FIG. 5A) which is also shown in FIG. 2C). As can be appreciated from above, the algorithm functions to assign a new object label each time a new object is encountered, in scanning from a right-to-left, top-to-bottom direction, where the background (the first object encountered) is assigned an object label of 0. The labelling of the large U-shaped object and its embedded triangle involves merging operations which will be considered further below. The labelled image is shown in FIG. 5B. It can be seen from the imaging that the labelling program determines (a) the total number of objects in the image, (b) the order the objects are encountered in a right-to-left top-to-bottom direction, and (c) the number of objects in each class. Of course, the output of the labelling program is not necessarily a labelled image, but information about kind, position, and numbers of objects. The labelling program can also be adapted to calculate various geometric properties as will be described more fully in Section C below.

The algorithm shown in FIG. 4 is preferably executed, according to another aspect of the invention, by a case analysis in which, at each scanning position, a same/not-same pattern of classification values in the scanning window is generated, and identified as one of fifteen possible classification patterns (in the two-dimensional case). The identified pattern then dictates the assignment of object labels to the scanned pixel and the merging of previously labelled objects.

Figure 6:
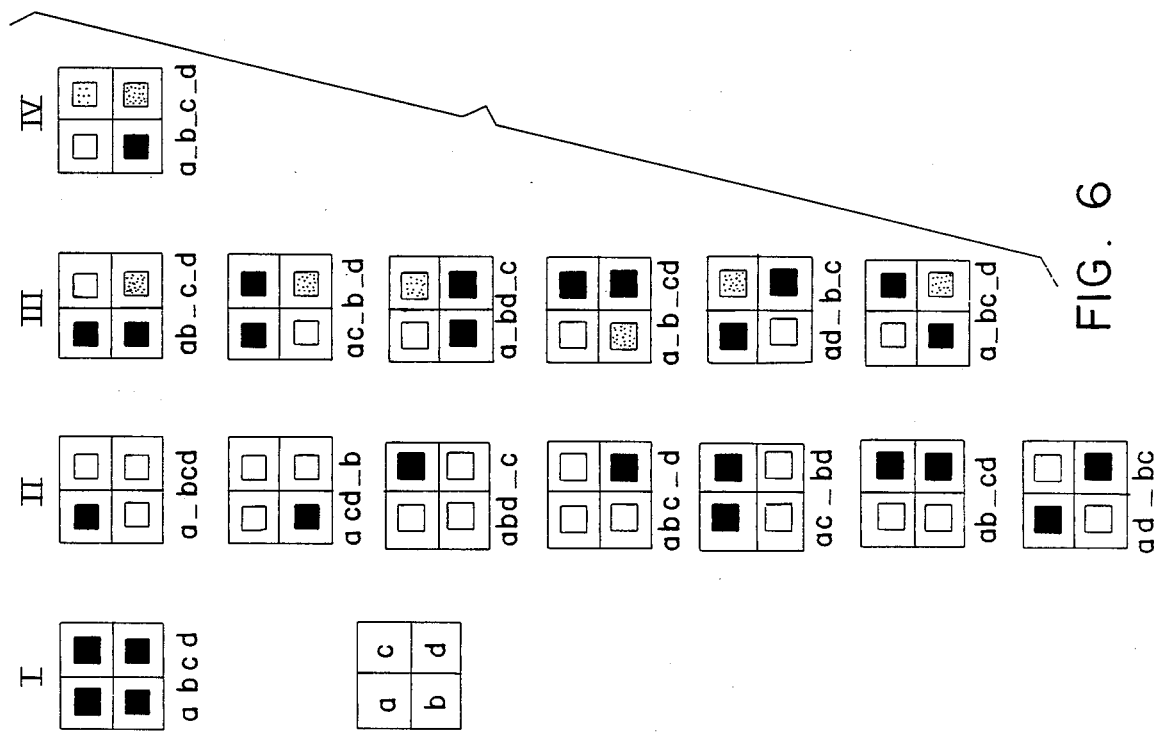
FIG. 6 shows the 15 same/not-same cases which are considered for a 2×2 scanning window at each element being scanned.

The fifteen possible patterns of same/not-same classification values in a 2×2 scanning window are shown in FIG. 6. Notationally, the four positions or cells in the window are designated a, b, c, d, as indicated at the left in FIG. 6. For convention, the pixel being scanned will be in the d cell in the window. The fifteen patterns were generated by considering all possible ways in which the four pixels can have the same or different values. These are a=−b (read a is equal or not equal to b), a=−c, a=−d, b=−c, b=−d, and c=−d, i.e., $2^6$ possibilities. Eliminating all of the inconsistent possibilities (e.g., a =b, a =c, b not =c) yields the fifteen patterns seen in the figure. These can be are classed into four groups, depending upon whether all four cells contain the same classification value (group I), exactly two different values appear (group II), exactly three different values appear (group III), and all four values are different (group IV). The four groups are seen in FIG. 6.

The fifteen patterns in FIG. 6 are denoted by a string of letters and underscores according to the following two rules: cell names that have the same classification value are grouped together in alphabetical order, and (2) groups are delimited by underscoring. For instance, a_bd_c indicates that the classification value in cell a is distinct from that in cells b, c, or d, and that both values in b and d are the same but differ from that in cell c. It is emphasized that the pattern analysis treats all identical same/not-same patterns in the same way. Thus the scanning window whose classification values are represented as 1_22_0, 5_88_2, and 0_22_4 are all handled in the same way.

Figure 7:
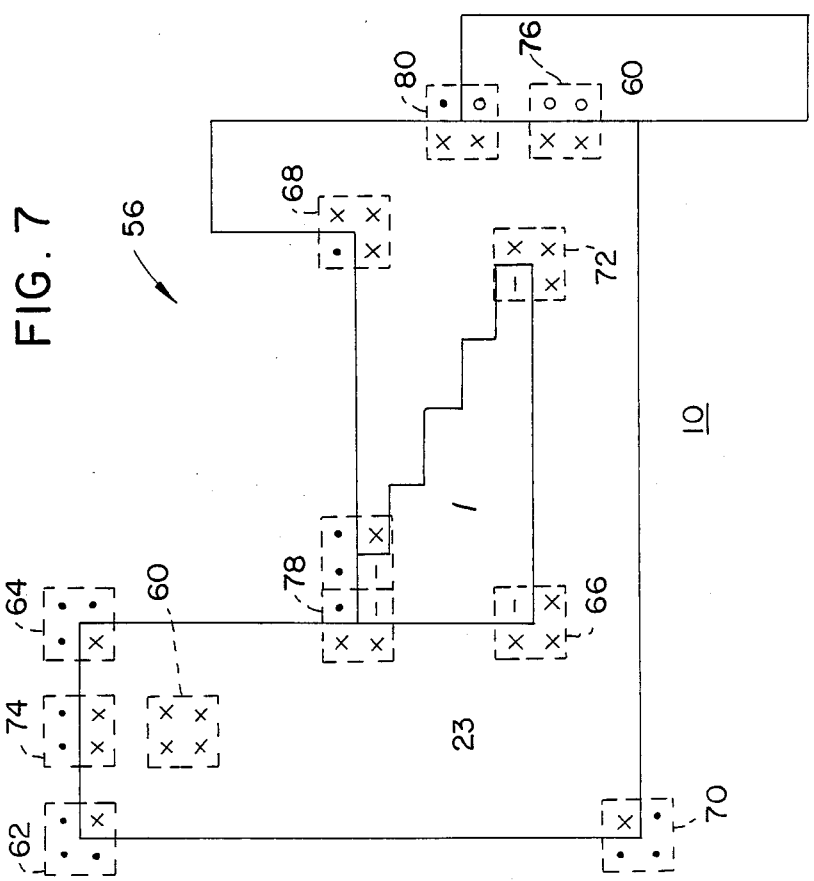
FIG. 7 is an enlarged portion of a digitized two-dimensional, multi-colored image, showing several scanning window positions.

Several case-handling situations will now be considered with reference to FIG. 7, which shows an enlarged portion of image 56 in FIGS. 2A and 5A including the large U-shaped object in the image. Here the classification values 10, 23, 1, and 60 are indicated by dots, X's, -'s, and o's, respectively. The adcd pattern in group I, shown at 60 in the figure, indicates that the window is within an object, and that no new labelling is required.

The top four patterns in group II, which contain a single unique cell in each corner, can indicate either an external or an internal corner of an existing or new object, as can be appreciated from the patterns indicated at 62-72 in the figure. A new object will be labelled only in the case of the abc_d pattern, which marks the upper left corner of a new object. If any of the first three patterns occur, the scanned pixel is labelled with an existing label.

If the a_bcd pattern occurs (indicating that the classification values are the same for b, c, and d), the object labels assigned to b and c are examined. If b and c have different object labels, the b and c labels are merged into a single value. Windows 68 and 72 in FIG. 7 illustrate cases where merger would occur. It can be appreciated, by following the direction of scan, that the two arms of the U-shaped objects would initially have been assigned distinct object values, $L_1$ and $L_2$, and that the region immediately above the embedded triangle in the U-shaped object would have been assigned a third object value $L_3$. At the window position 68, the merger of $L_3$ and $L_2$ would occur and this merged label would be merged with $L_1$ at window position 72, giving a single object label to the U-shaped object. The merging feature just described is an inherent feature of 6-connectivity. Note that in the case of 8-connectivity, the two white cells in the ad—bc pattern at the bottom of group II would be merged, creating object ambiguity, since the two dark cells are also connected and therefore contained in a single object.

The next two group II patterns indicate movement along a border between two objects, as indicated by windows 74 and 76 in the figure. The final group II window occurs pixel d is connected to pixel a by a diagonal connection. The connectivity is a feature of 6-, but not of 4-connectivity.

The group III patterns can be similarly treated: A new object label is assigned to the scanned (d) pixel whenever the pattern contains a unique classification value at the d position (windows 78, 80). Otherwise the scanned pixel is assigned the label of the other pixel having the same classification value. No merging is possible, since the condition of sameness between three orthogonal elements, including the pixel being scanned, will not apply.

The single class IV pattern occurs at the corner of four distinct objects, and always involves labelling the scanned pixel with a new object label.

A computer program which carries out the above case analysis on a two-dimensional multi-valued image is attached as Appendix A. The program is written in C program language.

C. Object Properties

The case analysis algorithm described in Section B may be readily combined with object-feature calculations, to determine position and geometrical properties of the objects, such as area, moments, and perimeter. In the 2-dimensional case, each of the 15 possible scanning-window patterns are used to effect, in addition to the object labelling, specified geometric-feature calculations. In one preferred approach, the case analysis is used to generate horizontal runs in each object, i.e., strings of pixels which define the horizontal rows making up each object. These runs are calculated on an updated basis during the labelling algorithm.

The use of the case analysis in generating the runs can be appreciated with reference to FIG. 7. The first run which is encountered in the figure occurs at scanning window 62, which, as noted above, indicates the upper left corner of a new object. Thereafter, when the pattern in scanning window 74 occurs, the run is extended by one pixel. The run is terminated when the pattern seen in window 64 is registered. Here it is noted that, more generally, the beginning and end of a first-row run can also be signalled by group II and III and IV patterns in which d and b, respectively, are unique elements.

The second row in an object is signalled by any of the group II, III, or IV patterns at which the d cell is first assigned the same label as in the first row, and is terminated when the same cell is first switched to another label. With reference to the figure, the second row of the large figure is initiated by pattern ab—cd, and terminated by the same pattern. In a merging operation, horizontal runs on the same row which have different labels are simply given the same object label. During the generation of each run, calculations related to area, moment, perimeter, and position of the object may be made, such as the sum of the i values in the run, the sum of $i^2$, and the sum of ij, where j is a constant for each row. The final geometric figure calculations may be made on a row-by-row basis, or performed at the end of the labelling program from the horizontal runs generated during the labelling. For example, to calculate total object area, the areas of each of the rows with the same object label are simply summed, and the summing is done either on an updated basis or at the end of the scanning procedure.

The program in appendix A illustrates how geometric calculations based on the sums of i (i moment), j (j moment), ij (ij cross moment), and $i^2$ and $j^2$ ($i2$ and $j2$ moments) are performed on an updated basis during the case analysis program.

The information generated from the program can be used for higher order scene analysis, according to known methods.

From the foregoing, it can be seen how various objects and features of the invention are met. The method and apparatus allow for rapid analysis of multi-valued images, for generating information relating to total number of objects in the image, types of objects, number of each type of object, and geometric properties of each object. The algorithm used in the method, which is based on same/not-same case analysis, rather than absolute-value analysis, can be performed substantially as fast as binary image analysis. The present invention, however, is much more versatile and faster in analyzing images containing many different types of classes which must be identified and characterized.

The invention can be readily adapted to a number of important applications, such as quality control of complex circuit components and other industrial products, image analysis of satellite pictures, and robotics vision, for locating and manipulating objects in a multi-valued sensory field.

While the invention has been described with respect to various preferred embodiments and applications, it will be appreciated that various changes and modifications can be made without departing from the invention.

Appendix A

```
/*
    This file contains program blobscan() and functions
    closely related to it.  Blobscan() is the essential
    part of connectivity analysis.

Written and Commented by Jing Wang (8/14/86)
*/ include <stdio.h>
include "blob.h"
```

Appendix A

```
char *calloc();
BLOB *balloc(), *lookup();
RUN  *ralloc();

BPTYPE *bp;
BLOB *avail;
RUN **rp;
int ilsave, irsave, jlsave, jrsave;

static BLOB *root, *curreg, *regavv;
static RUN *crun, *prun;
static int *cline, *pline, i, j, newflag, leftend;

/*
        walloc is used to dynamically allocate work space
        according to nrow and ncol
*/ walloc(nrow, ncol)
int nrow, ncol;
{
        bp = (BPTYPE *) calloc(MAXNUM, sizeof(BPTYPE));
        rp = (RUN **) calloc(nrow + 5, sizeof(RUN *));
        cline = (int *) calloc(ncol + 2, sizeof(int));
        pline = (int *) calloc(ncol + 2, sizeof(int));
}

/*
        balloc() allocates a blob structure and returns
        the pointer to it
*/

BLOB *balloc()
{
        static int offset = BCHUNK;
        static int counter = 0;
        static BLOB *ptr;

if (offset == BCHUNK) {
                offset = 0;
                ptr = (BLOB *) calloc(BCHUNK, sizeof(BLOB));
        }
        (ptr + offset)->id = counter++;
        return(ptr + offset++);
}

/*
        ralloc() allocates a run structure and returns a pointer
        to it.
*/

RUN *ralloc()
{
        static int offset = RCHUNK;
        static int counter = 0;
        static RUN *ptr;

if (offset == RCHUNK) {
                offset = 0;
                ptr = (RUN *) calloc(RCHUNK, sizeof(RUN));
        }
        (ptr + offset)->id = counter++;
        return(ptr + offset++);
}

/*
        alloc() is called directly from blobscan(). If the
        available list is not empty, a blob structrure is
        allocated from it.  Otherwise, a blob structure is
        allocated by calling ralloc().
*/ alloc()
{
        BLOB *tmp;
        newflag = 0;
```

Appendix A

```
                if (avail == NULL)
                        curreg = balloc();
                else {
                        curreg = avail;
                        avail = avail->flink;
                }
                initblob(curreg, crun->start, i - 1, j);
                tmp = regabv->flink;
                regabv->flink = curreg;
                curreg->flink = tmp;
                tmp->rlink = curreg;
                curreg->rlink = regabv;
}

/*
        getline() puts the thresholded image pic into buffer l
*/ getline(pic, j, l)
int **pic;
int j, l[];
{
        int i;

if (j <= jrsave) {
                l[ilsave - 1] = 0;
                for (i = ilsave; i <= irsave; i++)
                        l[i] = threshold(*(pic[j] + i));
                l[i] = 0;
        } else
                for (i = ilsave-1;i <= irsave+1;l[i++] = 0);
}

/*
        lookup() returns a pointer to a blob whose label is
        equivalent to n.
*/

BLOB *lookup(n)
int n;
{
        while (bp[n].num < 0)
                n = -bp[n].num;
        return(bp[n].ptr);
}

/*
        nlookup() returns the label of the blob whose label
        is equivalent to n.
*/ nlookup(n)
int n;
{
        while (bp[n].num < 0)
                n = -bp[n].num;
        return(n);
}

/*
        initblob() initializes blob b using l (as mini) r (as
        maxi) and j (as minj)
*/ initblob(b, l, r, j)
BLOB *b;
int l, r, j;
{
        static int bn = 1;

if (bn >= MAXNUM){
                printf("Blob number overflow\n");
                exit(1);
        }
        bp[bn].num = 0;
        bp[bn].ptr = b;
```

```
        b->number = bn++;
        b->parent = b->child = b->sibling = NULL;
        b->color = cline[r];
        b->nholes = 0;
        b->area = b->perim = b->sumi = b->sumj = 0;
        b->sumi2 = b->sumij = b->sumj2 = 0;
        b->imin = l;
        b->imax = r;
        b->jmin = b->jmax = j;
}

/*
        update() closes a run and calculates the statistical
        contributions that the run made to the blob to which
        it belongs. The attributes associated with this blob
        are also updated. A new run, pointed to by crun, is
        allocated and initialized.
*/ update(eol)
int eol;
{
        RUN *new;
        long l, k;
        l = crun->length = i - crun->start;
        crun->number = curreg->number;
        crun->j = j;
        curreg->perim += 2;
        k = crun->start;
        curreg->area += l;
        curreg->sumi += l * (l - 1 + 2 * k) / 2;
        curreg->sumj += l * j;
        curreg->sumi2 += l*((l-1)*(6*k+2*l-1)+6*k*k) / 6;
        curreg->sumij += l * (l - 1 + 2 * k) * j / 2;
        curreg->sumj2 += l * j * j;
        if (crun->start < curreg->imin)
                curreg->imin = crun->start;
        if (i - 1 > curreg->imax)
                curreg->imax = i - 1;
        curreg->jmax = j;
        new = ralloc();
        if (eol) {
                crun->link = NULL;
                crun = new;
                crun->start = ilsave - 1;
                prun = rp[j];
        } else {
                crun->link = new;
                crun = new;
                crun->start = i;
        }
}

/*
        The following is the set of handling routines: a total
        of 15 of them.
*/ abc_d()
{
        update(0);
        leftend = i;
        newflag = 1;
} abd_c()
{
        leftend = i;
        prun = prun->link;
        regabv = lookup(prun->number);
} ab_cd()
{
        update(0);
        prun = prun->link;
        curreg = regabv = lookup(prun->number);
```

Appendix A

```c
} acd_b()
{
        if (newflag) alloc();
        update(0);
        curreg->perim += i - leftend;
        regabv->perim += i - leftend;
        curreg = regabv;
} ad_bc()
{
        if (newflag) alloc();
        update(0);
        curreg->perim += i - leftend;
        regabv->perim += i - leftend;
        curreg = regabv;
        prun = prun->link;
        regabv = lookup(prun->number);
        leftend = i;
} a_bcd()
{
        BLOB *tmp, *tmp2;
        BLOB *holreg = regabv;

prun = prun->link;
        regabv = lookup(prun->number);
        if (newflag) {
                newflag = 0;
                curreg = regabv;
                curreg->perim += i - leftend;
        } else if (curreg == regabv) {
                tmp = curreg->child;
                holreg->sibling = tmp;
                holreg->parent = curreg;
                curreg->child = holreg;
                (curreg->nholes)++;
                curreg->perim -= holreg->perim;
        } else {
                curreg->perim += regabv->perim + i - leftend;
                if (regabv->imin < curreg->imin)
                        curreg->imin = regabv->imin;
                if (regabv->imax > curreg->imax)
                        curreg->imax = regabv->imax;
                if (regabv->jmin < curreg->jmin)
                        curreg->jmin = regabv->jmin;
                curreg->area += regabv->area;
                curreg->sumi += regabv->sumi;
                curreg->sumj += regabv->sumj;
                curreg->sumi2 += regabv->sumi2;
                curreg->sumij += regabv->sumij;
                curreg->sumj2 += regabv->sumj2;
                if (regabv->nholes) {
                        curreg->nholes += regabv->nholes;
                        tmp = regabv->child;
                        while (tmp != NULL) {
                                tmp->parent = curreg;
                                tmp2 = tmp;
                                tmp = tmp2->sibling;
                        }
                        tmp2->sibling = curreg->child;
                        curreg->child = regabv->child;
                }
                (regabv->rlink)->flink = regabv->flink;
                (regabv->flink)->rlink = regabv->rlink;
                (bp[regabv->number]).num = -(curreg->number);
                regabv->flink = avail;
                avail = regabv;
                regabv = curreg;
                if (avail == root)
                        root = curreg;
        }
        holreg->perim += i - leftend;
}
```

Appendix A

```
abcd()
{
        /* This is a NOP */
} ac_bd()
{
        /* This is a NOP */
} a_b_c_d()
{
        if (newflag) alloc();
        update(0);
        regabv->perim += i - leftend;
        curreg->perim += i - leftend;
        newflag = 1;
        prun = prun->link;
        regabv = lookup(prun->number);
        leftend = i;
} ab_c_d()
{
        update(0);
        prun = prun->link;
        regabv = lookup(prun->number);
        leftend = i;
        newflag = 1;
} a_b_cd()
{
        if (newflag) alloc();
        update(0);
        regabv->perim += i - leftend;
        curreg->perim += i - leftend;
        prun = prun->link;
        curreg = regabv = lookup(prun->number);
} ac_b_d()
{
        if (newflag) alloc();
        update(0);
        regabv->perim += i - leftend;
        curreg->perim += i - leftend;
        newflag = 1;
        leftend = i;
} ad_b_c()
{
        if (newflag) alloc();
        update(0);
        regabv->perim += i - leftend;
        curreg->perim += i - leftend;
        curreg = regabv;
        prun = prun->link;
        regabv = lookup(prun->number);
        leftend = i;
} a_bc_d()
{
        BLOB *holreg = regabv;

prun = prun->link;
        regabv = lookup(prun->number);
        if (newflag) alloc();
        update(0);
        holreg->perim += i - leftend;
        curreg->perim += i - leftend;
        leftend = i;
        newflag = 1;
}
```

```
a_bd_c()
{
        regabv->perim += i - leftend;
        prun = prun->link;
        regabv = lookup(prun->number);
        leftend = i;
} inconsist()
{
        /* program should never reach here */
}

/*
        blobscan does multiple valued connectivity analysis on
        image pic of size il..ir by jl..jr.
*/

BLOB *blobscan(pic, il, jl, ir, jr)
int **pic, il, jl, ir, jr;
{
        static int (*process[64])() = { a_b_c_d, a_b_cd, a_bd_c,
                inconsist, inconsist, inconsist, a_bcd, ad_b_c,
                inconsist, inconsist, inconsist, ad_bc, inconsist,
                inconsist, ac_b_d, inconsist, ac_bd, inconsist,
                inconsist, inconsist, inconsist, inconsist, inconsist,
                inconsist, acd_b, inconsist, inconsist, inconsist,
                inconsist, inconsist, inconsist, ab_c_d, ab_cd,
                inconsist, inconsist, inconsist, inconsist, inconsist,
                inconsist, inconsist, inconsist, abd_c, inconsist,
                inconsist, inconsist, inconsist, inconsist, inconsist,
                inconsist, inconsist, inconsist, abc_d, inconsist,
                inconsist, inconsist, inconsist, inconsist, inconsist,
                inconsist, inconsist, inconsist, inconsist, abcd } ;
        int state, a, b, c, d, k;
        long l = ir - il + 3;

walloc(NROW, NCOL);
        ilsave = il; irsave = ir; jlsave = jl; jrsave = jr;
        avail = NULL;
        for (i = il - 1; i <= ir + 1; pline[i++] = 0);
        root = balloc();
        initblob(root, il - 1, ir + 1, jl - 1);
        root->flink = root->rlink = root;
        root->area = l;
        root->perim = l + 2;
        root->sumi = l * (il + ir) / 2;
        root->sumj = l * (jl - 1);
        root->sumi2 = l * ((long)(il - 1) * (il - 1) * 6 +
                        (l - 1) * (2 * l + 6 * il - 7)) / 6;
        root->sumj2 = l * (jl - 1) * (jl - 1);
        root->sumij = root->sumi * (jl - 1);
        rp[jl - 1] = prun = ralloc();
        prun->start = il - 1;
        prun->length = l;
        prun->number = 1;
        prun->j = jl - 1;
        crun = ralloc();
        crun->start = il - 1;
        for (j = jl; j <= jr + 1; j++) {
                newflag = 0;
                rp[j] = crun;
                getline(pic, j, cline);
                curreg = regabv = root;
                a = b = 0;
                for (i = il; i <= ir+1; i++) {
                        c = pline[i];
                        d = cline[i];
                        state = ((a == b) << 5) | ((a == c) << 4) |
                                ((a == d) << 3) | ((b == c) << 2) |
                                ((b == d) << 1) | (c == d);
                        a = c; b = d;
                        pline[i] = cline[i];
                        (*process[state])();
                }
                update(1);
```

Appendix A

```
}
    root->perim = (1 + jr - jl + 3) * 2;
    linkrun();
    for (j = jl - 1; j <= jr + 1; printrun(j++));
    return(root);
} linkrun()
{
    int   j, bindex;
    RUN  *ptr;

for (j = jlsave-1; j <= jrsave+1; j++) {
        for (ptr = rp[j]; ptr != NULL; ptr = ptr->link) {
            bindex = nlookup(ptr->number);
            ptr->blink = bp[bindex].run;
            bp[bindex].run = ptr;
```

It is claimed:

1. A computerized method of analyzing a sensory-input field containing three or more distinct classes of objects, said method comprising:

representing the field as a 2-dimensional array of elements in which (a) each element represents a portion of a single object in the field, (b) all of the elements representing the same class of objects are assigned a single classification value, and (c) each of the three or more classes of objects in the field is assigned a different classification value, scanning each individual element in the array systematically with a 2×2 window containing the element being scanned and three adjacent and connected window elements, where each of the adjacent window elements has been previously assigned an object label which uniquely identifies an object containing such adjacent element, determining the classification value of each individual element being scanned, matching the classification values in the 2×2 scanning window with one of fifteen same/not-same case patterns which indicates which of the elements in the window have the same classification values, and which have unique values, irrespective of actual classification values, from the same/not-same case pattern associated with the 2×2 window, assigning the element being scanned an existing object label or a new object label, storing the object labels determined for each of the scanned elements, and by said scanning and assigning, identifying each separate object in the field by a separate object label.

2. The method of claim 1, wherein object merging is performed whenever such an identified pattern has three orthogonal elements, including the element being scanned, which have the same classification value, and a fourth diagonal element which has a different classification value, and the two elements orthogonal to the element being scanned have been previously assigned different object labels.

3. The method of claim 1, for use in generating geometrical information about each object in the field, wherein such information is calculated on an updated basis during said scanning, based on the object label assignment made with respect to each scanned element.

4. The method of claim 1, for use in analyzing a black and white digitized image, wherein said representing includes the steps of forming an image-brightness histogram which contains at least three distinct brightness classes separated from each other by local minima, giving a unique classification value to each brightness class, and mapping each element in the array into one of the brightness classes and assigning to that element the classification value given to that brightness class.

5. The method of claim 1, for use in analyzing a multi colored field in which different colors represent different classes of objects, wherein said representing includes the steps of selecting a finite set of at least three different colors which is sufficient to allow representation of each different class in the field with a distinct color, giving a unique classification value to each of the different colors, and mapping each element in the array into one of the different colors and assigning to that element the classification value given to that color.

6. Apparatus for analyzing a sensory-input field containing three or more distinct classes of objects, said apparatus comprising:

a classification device for representing the field as a 2-dimensional arary of elements in which (a) each element represents a portion of a single object, (b) all of the elements representing the same class of objects are assigned a single classification value, and (c) each of the three or more classes of objects in the field is assigned a different classification value, means for scanning each individual element in the array systematically with a 2×2 window containing the element being scanned and three adjacent and connected window elements, where each of the adjacent window elements has been previously assigned on object label which uniquely identifies an object containing such adjacent element, program means for (i) determining the classification value of each individual element being scanned, matching the classification values in the 2×2 scanning window with one of fifteen possible same/not-same case patterns which indicate which of the elements in the window have the same classification values, and which have unique values, irrespective of actual classification values, and (ii) from the same/not-same case pattern associated with the 2×2 window, assigning the element being scanned an existing object label or a new object label, and a storage buffer for storing the object labels assigned to each of the scanned elements.

7. The apparatus of claim 6, which further includes means for merging all orthogonally connected objects having the same classification value but different object labels.

8. The apparatus of claim 6, for use in identifying objects in a black and white 2-dimensional image field, based on the different brightness of different objects in the field, wherein the classification device includes
- means for photoimaging the field to produce a 2-dimensional array of element in which each element has a certain brightness value,
- means for constructing an image-brightness histogram which contains, for each class of objects in the field, at least three brightness classes which are separated from each other by local minima, and
- means for assigning to each element in the array, a classification value corresponding to the brightness class whose brightness range includes the brightness value of that element.

9. The apparatus of claim 6, for use in analyzing a multi-colored 2-dimensional field in which different colors represent different classes of objects, wherein said classification device includes
- means for photoimaging the field to produce a 2-dimensional array of elements in which the color associated with each element is indicated by a vector in a defined color space,
- means for associating each element vector with one of a at least three color regions in the color space, where the total number of color regions is sufficient to allow representation of each different class in the field with a distinct color region, and
- means for mapping each element in the array into one of the different colors and assigning to that element the classification value associated with the color.

* * * * *